(12) United States Patent
Botros et al.

(10) Patent No.: US 8,380,752 B2
(45) Date of Patent: Feb. 19, 2013

(54) CUSTOMIZED REPORTING AND MINING OF EVENT DATA

(75) Inventors: Sherif Botros, Redwood City, CA (US); Jian L. Zhen, Fremont, CA (US); Minjun Liu, Santa Clara, CA (US); Boris Galitsky, San Jose, CA (US)

(73) Assignee: LogLogic, Inc., San Jose, CA (US)

( * ) Notice: Subject to any disclaimer, the term of this patent is extended or adjusted under 35 U.S.C. 154(b) by 0 days.

(21) Appl. No.: 13/084,288

(22) Filed: Apr. 11, 2011

(65) Prior Publication Data

US 2011/0191373 A1 Aug. 4, 2011

Related U.S. Application Data

(63) Continuation of application No. 11/623,010, filed on Jan. 12, 2007, now Pat. No. 7,925,678.

(51) Int. Cl.
*G06F 17/30* (2006.01)
(52) U.S. Cl. ...................................... 707/802; 707/803
(58) Field of Classification Search ............ 707/999.102, 707/802–803; 719/318
See application file for complete search history.

(56) References Cited

U.S. PATENT DOCUMENTS

| 7,062,681 | B2 | 6/2006 | Larsson et al. |
| 7,461,069 | B2 | 12/2008 | Ikegami |
| 2002/0198882 | A1 | 12/2002 | Linden et al. |
| 2005/0033803 | A1 | 2/2005 | Vleet et al. |
| 2005/0223027 | A1* | 10/2005 | Lawrence et al. ......... 707/103 R |
| 2006/0288014 | A1 | 12/2006 | Edwards et al. |

OTHER PUBLICATIONS

Tim Oates et al.; "Automatically Acquiring Rules for Event Correlation From Event Logs"; Computer Science Technical Report; Mar. 2000; 8 pages.*

* cited by examiner

*Primary Examiner* — Monica Pyo
(74) *Attorney, Agent, or Firm* — Fish & Richardson P.C.

(57) ABSTRACT

Event data (e.g., log messages) are represented as sets of attribute/value pairs. An index maps each attribute/value pair or attribute/value tuple to a pointer that points to event data which contains the attribute/value pair or attribute/value tuple. An attribute co-occurrence map or matrix can be generated that includes attribute names that co-occur together. Queries and custom reports can be generated by projecting event data into one or more attributes or attribute/value pairs, and then determining statistics on other attributes using a combination of the inverted index, the attribute co-occurrence map or matrix, operations on sets and/or math and statistical functions.

15 Claims, 5 Drawing Sheets

FIG. 1

FIG. 2A $$\begin{array}{c} \phantom{attr_{n-1}} \\ \phantom{attr_{n-1}} \\ \begin{array}{c} attr_1 \\ attr_2 \\ . \\ . \\ . \\ attr_{n-1} \\ attr_n \end{array} \begin{array}{cccccc} attr_1 & attr_2 & \ldots & attr_{n-1} & attr_n \\ \left[\begin{array}{ccccc} 0 & 0 & \ldots & 0 & 1 \\ 0 & 0 & \ldots & 1 & 0 \\ . & . & . & . & . \\ . & . & . & . & . \\ . & . & . & . & . \\ 1 & 1 & \ldots & 0 & 1 \\ 1 & 0 & \ldots & 1 & 0 \end{array}\right] \end{array} \end{array}$$

CUSTOMIZED REPORTING AND MINING OF EVENT DATA

CROSS-REFERENCE TO RELATED APPLICATIONS

This application is a continuation of U.S. patent application Ser. No. 11/623,010, filed on Jan. 12, 2007, the entire contents of which are hereby incorporated by reference.

TECHNICAL FIELD

The subject matter of this application is generally related to computer log management.

BACKGROUND

Log management is the process of collecting, aggregating, analyzing, alerting on and archiving data from various computer network devices, such as servers, routers, switches, firewalls, etc. Log management can assist in achieving corporate compliance goals and reduces the risk of legal exposure from security breaches. Log management can significantly reduce network downtime by helping information technology (IT) departments identify and fix network issues resulting from misuse, malicious attacks and failed systems.

One of the most important aspects of log management is the ability to generate new and customized reports. Conventional approaches use predefined data structures (e.g., database schema, tables, attributes) to generate customized reports. Such conventional approaches, however, are inflexible in that users can neither define custom attributes nor custom annotate logs.

SUMMARY

Event data (e.g., log messages) are represented as sets of attribute/value pairs. An index maps each attribute/value pair or attribute/value tuple to a pointer that points to event data which contains the attribute/value pair or attribute/value tuple. An attribute co-occurrence map or matrix can be generated that includes attribute names that co-occur together. Queries and custom reports can be generated by projecting event data into one or more attributes or attribute/value pairs, and then determining statistics on other attributes using a combination of the index, the attribute co-occurrence map or matrix, operations on sets and/or math and statistical functions.

The disclosed implementations can lower the cost of developing new reports and custom reports in log management systems, and provide users of such systems the flexibility to easily create and modify reports related to event data. The disclosed implementations allow users to represent event data as arbitrary attribute/value pairs without using a predefined schema. The disclosed implementations allow users to annotate logs with arbitrary attributes and values, collect statistics for groups of attribute/values, and use the collected statistics to generate reports, visualize the behavior of their IT systems, or generate real-time alerts.

Other implementations of customized reporting and mining of event data are disclosed, including implementations directed to systems, methods, apparatuses, computer-readable mediums and user interfaces.

DETAILED DESCRIPTION

Log Management System Overview

Figure 1:
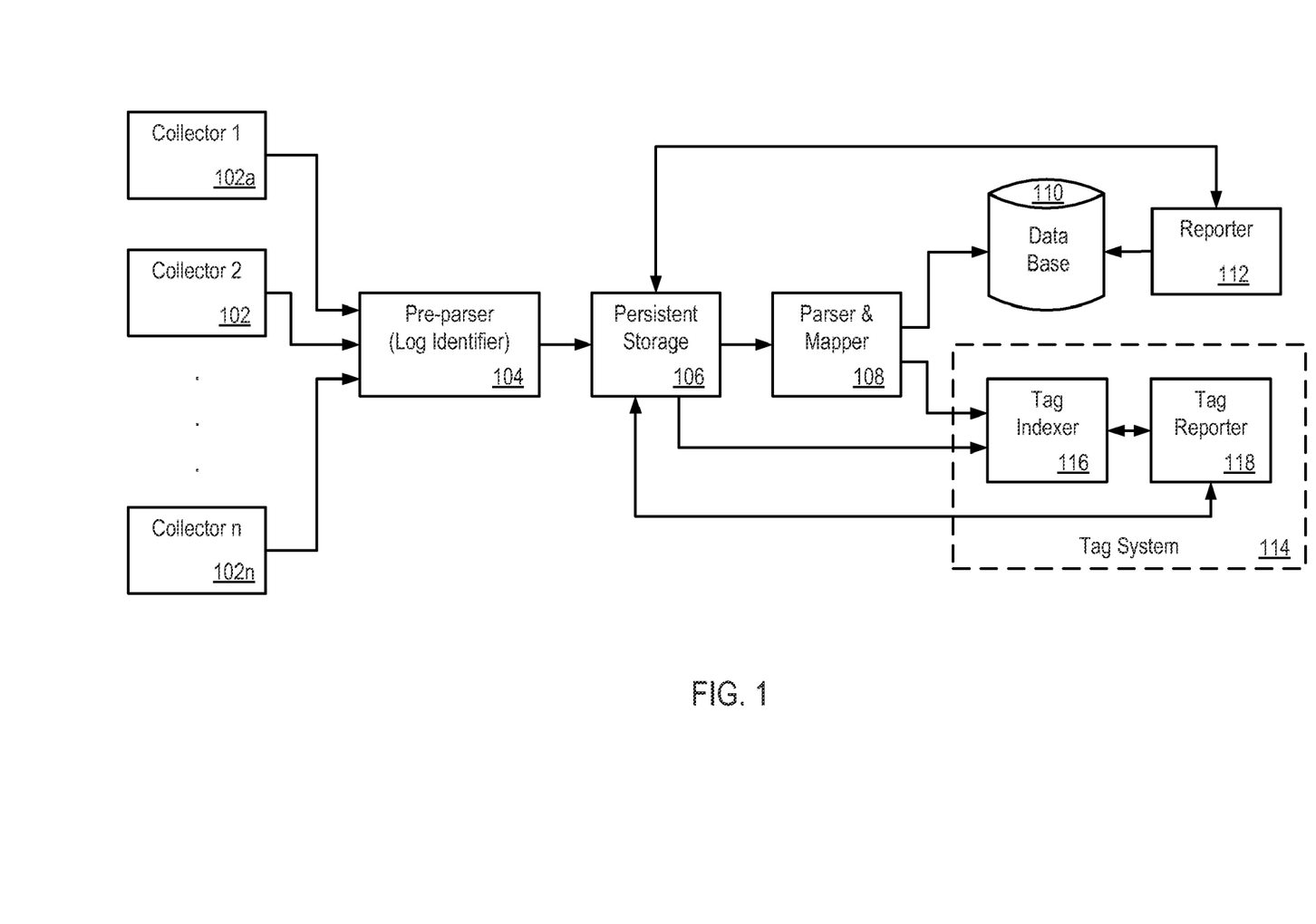
FIG. 1 is a block diagram of an exemplary log management system.

FIG. 1 is a block diagram of an exemplary log management system 100. In some implementations, the log management system 100 includes one or more collectors 102a through 102n, a pre-parser 104, persistent storage 106, a parser/mapper 108, a database 110, a reporter 112 and a tag system 114. The tag system 114 further includes a tag indexer 116 and a tag reporter 118. Such implementations allow one or more users to use the reporter 112 and the tag reporter 118 to generate new reports and customized reports on data collected by the collectors 102a through 102n. The event data (e.g., log messages) for such reports can be collected and processed by the remaining components of the log management system 100. Hereinafter, the term "tag" and "attribute" are used interchangeably. Tags/attributes are entities that define properties or characteristics of objects or elements. Tags/attributes usually, but not always, consist of a name and value.

In some implementations, the collectors 102a through 102n are operationally coupled with the pre-parser 104. In some implementations, the various components of the system 100 can be co-located on the same hardware platform, or located on multiple hardware platforms connected by one or more networks (e.g., Ethernet, Internet, intranet). Each of the collectors 102a through 102n can be any device that collects event data from one or more other computing devices or applications. Such information collection can be active or passive, and can include information such as error messages, user transactions, system events, application milestones, and data access attempts, etc. For example, the collector 102a can be a LogLogic LX 500 appliance (manufactured by loglogic, Inc. of San Jose, Calif.), which can be configured to passively collect and analyze information, such as, for example, messages, errors and transactions as they occur on one or more data servers. Other event information collected actively from the same servers may include availability status, current storage capacities, resource usage, etc. In another example, the collector 102b can be a LogLogic LX 2000 appliance, which can be configured to actively and passively collect and analyze information from e-mail systems, such as, for example, message/attachment statistics, failed login attempts, password changes, etc.

The information collected by collectors 102a through 102n is transmitted to the pre-parser 104. Such information can be transmitted via "flat files" produced by sequentially logging events as they occur, or as periodic messages representing snippets of the flat files. In some implementations, transmission of log data can follow one or more standard networking protocols, such as Transmission Control Protocol (TCP), for transmitting data as a stream of bytes. The collectors also append information to each log message which describes the context of the message (e.g. time the log message was received by the collector, the source device where the message originated).

The pre-parser 104 receives raw log information, together with the context header generated by the collectors, from the one or more collectors 102*a* through 102*n*. During the process, the pre-parser 104 determines the log source type and version, using pre-defined signatures for each log source (e.g. Cisco® Firewall version 7, Oracle® Database version 10). The pre-parser 104 stores this information with the unaltered log information in persistent storage 106 for subsequent use by the log management system 100.

The system 100 uses the persistent storage 106 to store log information received from the pre-parser 104. In some implementations, the storage method can employ one or more "flat files" containing individual logs messages. For example, a "row" in a flat file containing log messages from an email system may contain a user's name (e.g., "Matt"), IP address, location, and event occurrence, such as a failed login attempt. Such an entry may include a timestamp for identifying the time (e.g., down to the minute or fraction of a second) that the entry was made. In some implementations, the system 100 may be configured to retain certain logs in the persistent storage 106 for a user-specified period of time. For example, log files containing event data pertinent to Health Insurance Portability and Accountability Act (HIPAA) regulations may be retained for several years.

The parser/mapper 108 uses log information contained in the persistent storage 106 to generate tags, or indices, representing the data. The process includes the action of parsing lines of log information stored in the persistent storage 106 while searching for pertinent event data. Such parsing processes may employ pre-defined parsing rules and keyword indices. For example, parsing a log file from an email application may employ parsing rules that specify that the system 100 is to search for user-related event data containing "USER_ID" and the user's name in brackets. In addition to parsing, the parser/mapper 108 maps the information it locates to the corresponding log file and associated event data in the log file. In such a way, a specific log file's event data, such as that containing "USER_ID:[MATT]," can be mapped. In another example, parsing rules and keywords may exist such that a daily application milestone, for example "CERES END OF DAY," is extracted from a system log along with a timestamp. Such information can be used to compare (and report over time) regular event occurrences, such as the "END OF DAY" event for an application named "CERES."

In some implementations, the operations performed by the parser/mapper 108 can occur in near real-time as log file entries are available in the persistent storage 106. In other implementations, the parser/mapper 108 can be scheduled to execute at pre-determined intervals or thresholds, such as those based on elapsed time or log file size.

The system 100 can store indices for mapped log information in one or more databases. For example, the system 100 can use the database 110 to store an inverted index representing mapped log information in the persistent storage 106. In some implementations, entries in the database 110 can be created by the parser/mapper 108. A user employing the reporter 112 can access the database 110 to aid in executing standard text searches using regular expressions.

One possible implementation of the attribute/value generation is done through regular expression rules. First a set of regular expression rules, which constitute the preparser rules, detect the "signature" of different message types. Once the log message type is identified by its signature, a set of rules, which constitute the parser rules, specific to the message types are applied to extract the different attribute/value sets from each message. After the initial extraction of the attribute/value sets, there may be additional rules which add additional attributes to the message. These latter set of rules essentially segment the space of the initial attribute/value set (generated by the regular expression rules) into regions, and label each region with a new attribute/value. We refer to these latter set of rules as mapping or classification rules.

An example of the process described above is as follows. First, a signature of the message identifies it as a "typeA" log. Next, rules for a "typeA" log are applied. This step could generate, for example, the attributes: user=uuu, device=ddd, action=aaa and result=rrr. If a user is in set {a, b, c} and an action is in set {a1, a2, a3}, then criticality=ccc. The overall attribute/value set for the message which gets stored will be the union of steps 1, 2 and 3 above, i.e., the message is transformed in the following set of attribute/value pairs: (message type=typeA, user=uuu, device=ddd, action=aaa, result=rrr, criticality=ccc).

The process of generating a report using the reporter 112 can begin when a query originating on the reporter 112 is sent to the database 110. For example, the query's purpose may be to search for email event data associated with a user named "MATT." Upon receipt of the query, the database 110 transmits the corresponding indices to the reporter 112. Using these indices, the reporter 112 requests the corresponding event data from the persistent storage 106. The reporter 112 receives the corresponding event data, completing the process. In some implementations, the database 110 and the reporter 112 can be implemented using open source database or search technologies, for example MySQL® or Lucene®. Using such technologies can facilitate token-based searches such as "find me all the event data entries that contain the phrase 'failed login attempt'." Such searches can utilize Boolean functions, wildcard characters, and other special query tools. However, the predefined schemas and structured reports available by using the database 110 and the reporter 112 alone may limit the complexity and scope of queries performed on the system 100. In particular, users may want to search on raw log messages with more sophisticated queries, particularly queries that are based upon relationships between attributes of related event data in the log files. Such reporting capabilities can be provided by the tag system 114, as described below.

Tag System Overview

The tag system 114 includes the tag indexer 116 and the tag reporter 118. The tag indexer 116 receives tags, or indexes, from the parser/mapper 108 based on the raw log data it processes in the persistent storage 106. The tag indexer 116 represents particular instances of information in the log files as unordered attribute/value pairs. In some implementations, the tag indexer 116 stores these attribute/value pairs as an inverted log index using a list of pointers to the raw log messages corresponding to the attribute/value. For example, an attribute/value pair may represent the name of a user (e.g., user=Matt) or the result of an action (e.g., action=failed login) on a particular server (e.g., server=email). The tag indexer 116 maintains a count of each attribute/value pair for each time period (e.g., user=Matt: 10, 12, 24 means that user=Matt occurs 10, 12, and 24 times in three consecutive hours). The tag indexer 116 may also maintain counts of attribute/value tuples, where a tuple is a set of attribute/value pairs that co-occur together. For example one such tuple may represent: user=Matt, action=failed login and server=email. In this case, this tuple represents the number of failed logins by user Matt on the email server for different time periods. In addition to the count representing the user's number of failed login attempts, the tag indexer 116 can maintain pointers (explained in more detail below) to the corresponding raw entries in the log files. Using the information contained in the tag indexer 116, the tag reporter 118 can be used to generate reports relating to attributes and values. Such reports can be more sophisticated than the standard token-based reports provided by the reporter 112 because the tag reporter 118 can utilize relationships among two or more related attribute/value pairs, as will be described in more detail below.

For example, while the reporter 112 may be used to generate a standard list of email system events, the tag reporter 118 may be used to plot the number of email messages over the last day, and group them by SPAM result. In another example, the tag reporter 118 may be used to generate a report of the highly confidential email messages, grouped by the top n senders.

In some implementations, a user interface (not shown) for the log management system 100 may contain separate tabs for the reporter 112 and the tag reporter 118. The user may further select functionality under each tab corresponding to the user's report requirements at the time. For example, controls under the tag reporter 118 tab may permit the user to view information such as attribute pairs (described below) that share relationships and can be used to generate reports that exploit such relationships. Other controls under the tag reporter 118 may facilitate the formulation and launching of reports using event data in the tag indexer 116.

Attribute/Tag Indexer

Figure 2A:
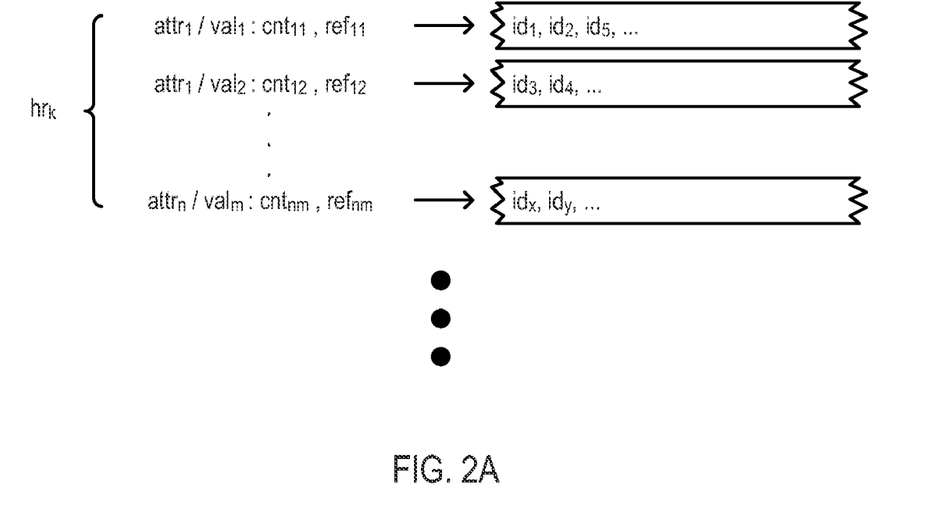
FIG. 2A illustrates a data structure for an exemplary tag indexer.

FIG. 2A illustrates a data structure 202 for the exemplary tag indexer 116. One or more attribute/value pairs may exist for each device for which event data is collected from log files and stored by the system 100. For example, referring to FIG. 2A, a device, such as an email server device, at a particular time $hr_k$, where $hr_k$ may be the log data collected from the email server for the $k^{th}$ hour. The mail server device includes attribute/value pairs $attr_1/val_1$ through $attr_n/val_m$, each representing a particular attribute and value of the device as defined by the user rules and parsed by the parser and mapper 108. For example, attribute $attr_1$ can be an "action result" which can have the value "failed_login." A "failed_login" value can represent a failed login attempt on the email server device during hour $hr_k$ by a "user=Matt" or "user=Susie" of the email system, where "user=" is also an attribute. Such a value may exist in the data structure for the mail server device during hour $hr_k$ if user Matt or Susie have made one or more failed login attempts on the device during hour $hr_k$, and these attempts have been captured in log files for the device during hour $hr_k$. A count of failed login attempts by, for example, user Matt, can be determined from an intersection of the attribute/value pair "user=Matt" with the attribute/value pair "action result=failed_login."

Each entry in the data structure 202 also includes a count $cnt_{nm}$ that represents the number of instances of each of the corresponding attribute/value pairs. For example, count $cnt_{11}$ can represent the number of instances of the attribute/value pair $attr_1/val_1$), which may represent an "action result" having "failed_login" as a value. In this example, count $cnt_{11}$ represents the number of login attempts on the email device in the time period $hr_k$ by user Matt. If the value for count $cnt_{11}$ is "3," the value indicates that the user Matt has three failed login attempts on the email device during the hour $hr_k$. Similarly, a count $cnt_{12}$ having a value of "2" may indicate that a different user, Susie, has had two failed login attempts on the same device. In general, an attribute/value pair such as $attr_n/val_m$ may have a value for a count $cnt_{nm}$ that represents the number of instances of the attribute n having the value m.

The data structure 202 also includes reference pointers $ref_{11}$ through $ref_{nm}$ that can be used to access the corresponding event data for the corresponding attribute/value pairs. For example, the line in the data structure for the attribute/value pair $attr_1/val_1$ includes a reference pointer $ref_{11}$. Using the example above, the reference pointer $ref_{11}$ can be used to access one or more virtual pointers, or indexes, to the particular event data corresponding to Matt's failed login attempts. In particular, if Matt has had three failed login attempts (e.g., as indicated by a value of "3" for the count $cnt_{11}$), the reference pointer $ref_{11}$ may point to three indexes $id_1$ through $id_3$, each pointing to separate instances of event data in the log files. Specifically, the event data may include common text such as "Failed login attempt by user [Matt]" in addition to unique timestamps indicating when the events occurred. These types of indexes can be stored in the data structure 202 when the parser/mapper 108 (see, FIG. 1) processes raw log data to extract useful attribute/value information. In general, the system 100 adds additional indexes, such as indexes $id_x$ and $id_y$, to attribute/value pairs, such as attribute/value pair $attr_n/val_m$, when the parser/mapper 108 processes the persistent storage 106 and encounters pertinent event data. A reference pointer $ref_{nm}$ points to these indexes. For each index that is added, the system 100 increments the corresponding count $cnt_{nm}$.

Attribute (or Tag) Co-Occurrence Matrix

Figure 2B:
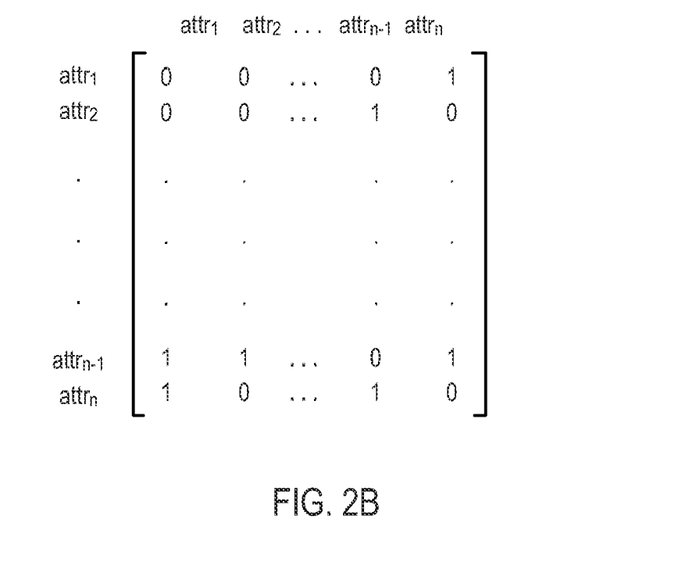
FIG. 2B illustrates a data structure for an exemplary attribute (or tag) co-occurrence matrix.

FIG. 2B illustrates a data structure for an exemplary attribute (or tag) co-occurrence matrix 240. The matrix 240 identifies relationships that exist between pairs of attributes, such as the attributes corresponding to the attribute/value pairs $attr_1$ through $attr_n$ described in FIG. 2A. These attributes form the row and column markings of the two-dimensional matrix 240. Each value in the matrix 240 can be either "1" or "0." A value of "1" signifies that the two attributes of the intersecting row and column markings share a relationship. As such, a user employing the tag reporter 118 can generate reports that may exploit the relationship shared by the two attributes. The attribute co-occurrence matrix constrains the set of reports that are possible. For example, if the attributes: "mail delivery result" and "table criticality" do not occur in a message, a report such as: find all the values of the "table criticality" attribute where "mail delivery result=failed" is meaningless and should not be allowed.

For example, the value in the matrix 240 for attribute pair $attr_1$ and $attr_2$ is "1." If the attributes in the matrix 240 are attributes of an email system, $attr_1$ can be, for example, the recipient of an email, and $attr_2$ can be the sender. Other attributes of event data from an email system may be, for example, the email message's size, its priority, or whether it has attachments. Some or all of these attributes may share relationships, and all that do are represented by values of one in the matrix 240. A "0" (e.g., zero) value in the matrix 240, such as that for the attribute pair $attr_1$ and $attr_{n-1}$, indicates that no relationship exists between the attributes. If $attr_{n-1}$ represents the email system being shut down or restarted, matrix values it shares with $attr_1$ can be "0" because recipients of individual email messages are not related. Having relationships among attributes can facilitate the generation of reports by the tag reporter 118 such as one listing the previous month's email events where Matt is both the sender and recipient of email messages having attachments bigger than 10 Mbytes. Such reports can include the raw event data pointed to by indexes.

Some implementations can include user-definable attributes such as those related to confidentiality of email messages, security classifications of message sent by a defense contractor, attempts made by health providers to access personal information of medical patients, and initiation of appliances that collect event data, to name a few examples.

Tag Index Creation Process

Figure 3:
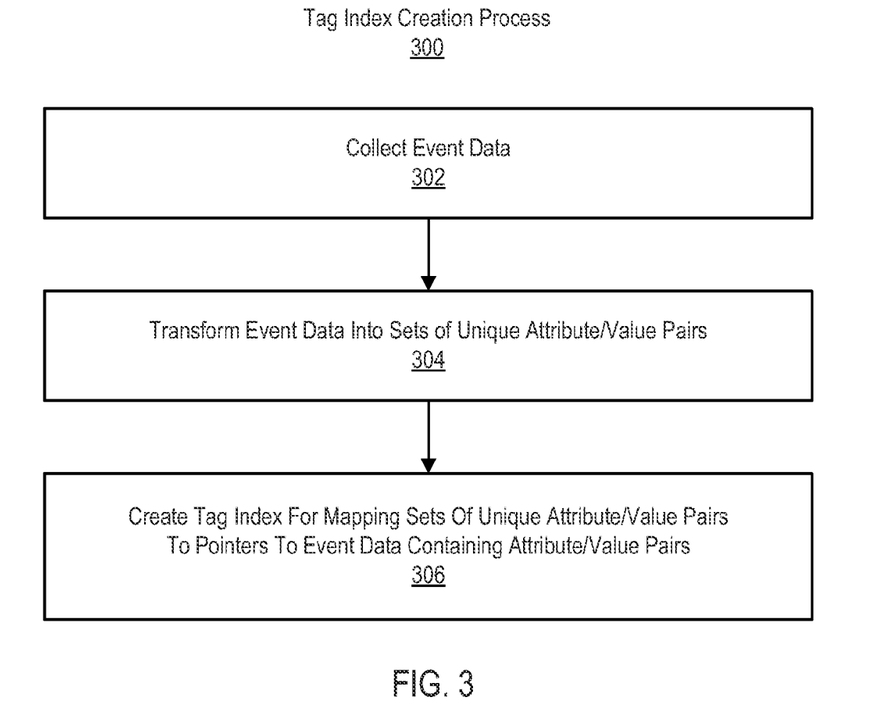
FIG. 3 is a flow diagram of an exemplary process for creating a tag index.

FIG. 3 is a flow diagram of a process 300 for creating an exemplary tag index. For example, the log management system 100 can use such a process 300 to build indexes for logs within its scope. Processing can start in step 302 when collectors 102a through 102n collect event data from various sources within the system 100 and the pre-parser 104 stores the raw information in persistent storage 106. For example, the collectors 102a through 102n may collect event data from sources, such as logs from email or other servers, and the event data may include error messages and pertinent events as they occur over time on the various sources.

In step 304, the system 100 transforms event data into sets of unique attribute/value pairs. For example, the parser/mapper 108 accesses raw log data stored in the persistent storage 106 and creates attribute/value pairs. These pairs can be represented as attribute/value pairs, such as $attr_1/val_1$ through $attr_n/val_m$, as described in reference to the data structure 202 shown in FIG. 2.

In step 306, the system 100 creates tag indexes for mapping the sets of unique attribute/value pairs to pointers to event data containing attribute/value pairs. For example, using a structure such as data structure 202, the system 100 can store indexes, such as $id_1$ through $id_y$, that point to the corresponding raw log data entries represented by the attribute/value pairs, such as $attr_1/val_1$ through $attr_n/val_m$. The system 100 can also use non-zero entries in the co-occurrence matrix 240 to identify the existence of relationships among certain attributes.

Event Data Report Creation Process

Figure 4:
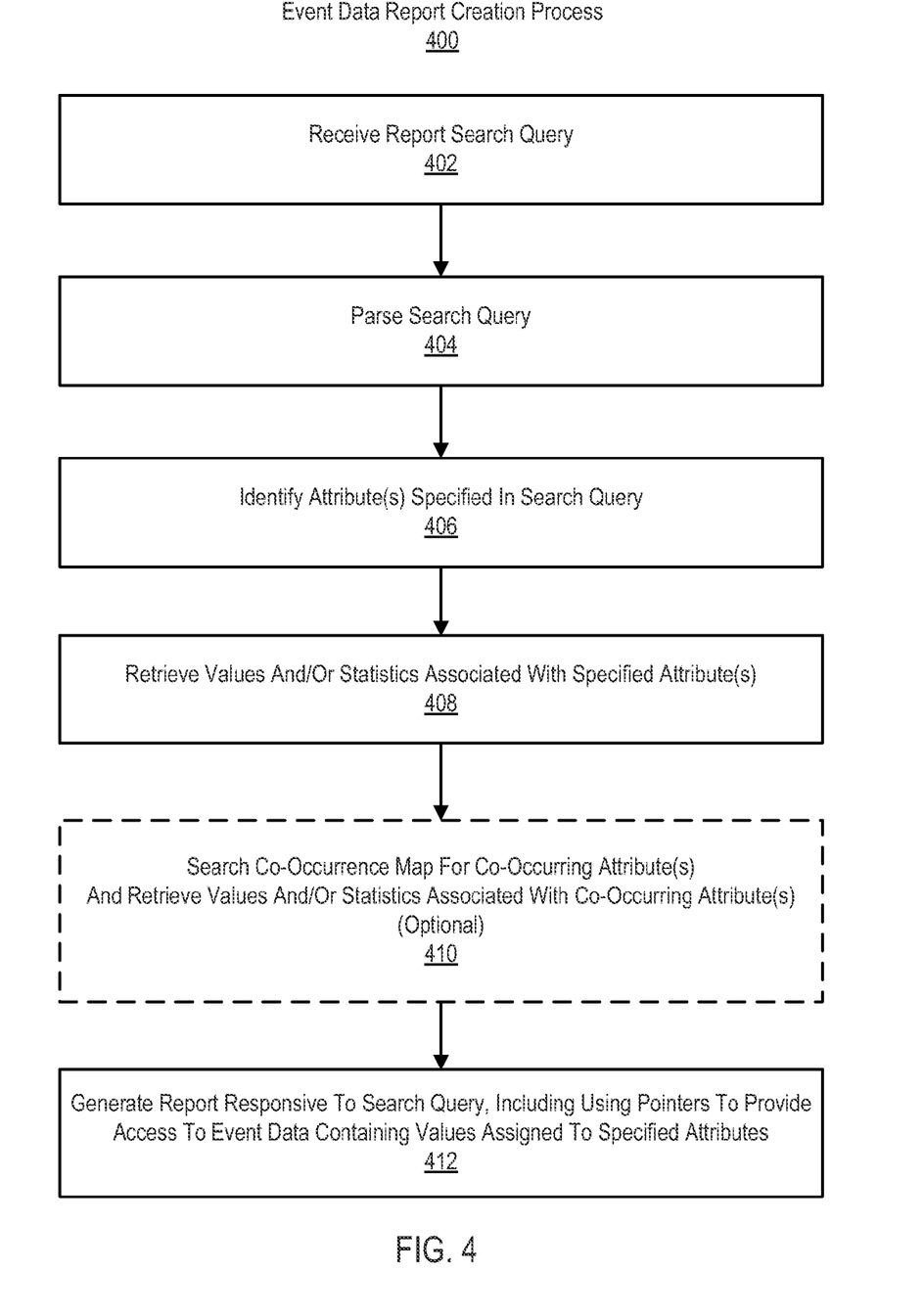
FIG. 4 is a flow diagram of an exemplary process for creating custom reports containing event data.

FIG. 4 is a flow diagram of a process 400 for creating reports containing event data. For example, the system 100 can use such a process 400 to obtain reports of event data collected from sources within its scope. Processing can start in step 402 when the system 100 receives a report search query. For example, such a query may originate from a user employing an interface to the tag reporter 118 to obtain information about log events, such as failed login attempts on a mail server, stored in persistent storage 106.

In step 404, the system 100 parses the search query received in step 402. For example, the tag reporter 118 may determine that the search query received from the user contains words or phrases indicating that the user is interested in obtaining a report listing failed login attempts by a user named "Matt" on a particular mail server.

In step 406, the system 100 identifies one or more attributes specified in search query. For example, the tag reporter 118 may use the words or phrases parsed from the user's query to access corresponding indexes in the tag indexer 116. Such indexes may correspond, for example, to attributes $attr_1$ through $attr_n$, as described in reference to the data structure 202 shown in FIG. 2.

In step 408, the system 100 retrieves values and/or statistics associated with the specified attributes. For example, the tag reporter 118 retrieves the corresponding indexes corresponding to the attributes represented by the query. In particular, the tag reporter 118 can access the indexes, such as $id_1$ through $id_y$, corresponding to the attributes, such as attributes $attr_1$ through $attr_n$. This information can be stored in a structure such as data structure 202 within the tag indexer 116.

In optional step 410, the system 100 searches co-occurrence maps for co-occurring attributes and retrieves values and/or statistics associated with co-occurring attributes. For example, to satisfy user queries that may pertain to more than one related attribute, the tag reporter 118 can access entries in the co-occurrence matrix 240 corresponding to related pairs of attributes. Such a query may be used, for example, to identify failed login attempts numbering above a certain threshold by a certain mail user such as "Matt."

Host Device Architecture

Figure 5:
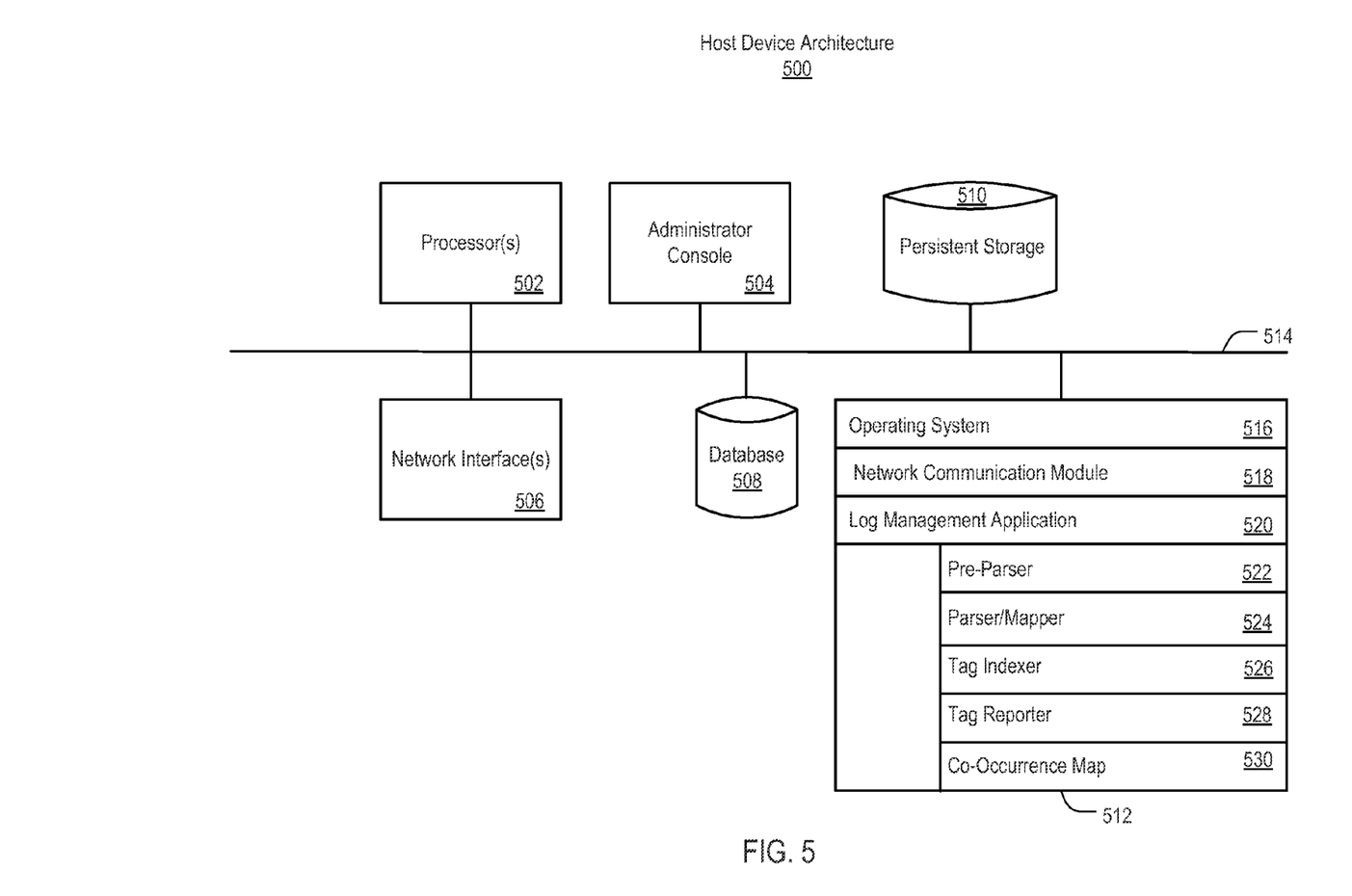
FIG. 5 is a block diagram of an exemplary architecture for hosting a tag index.

FIG. 5 is a block of an exemplary architecture 500 for hosting a tag system 114. In some implementations, the architecture 500 includes one or more processors 502 (e.g., dual-core Intel® Xeon® Processors), an optional administrator console 504, one or more network interfaces 506, a database 508, persistent storage 510 and memory 512 (e.g., RAM, ROM, SDRAM, flash memory). These components can exchange communications and data over one or more communication channels 514 (e.g., Ethernet, Enterprise Service Bus, PCI, PCI-Express, etc.), which can include various known network devices (e.g., routers, hubs, gateways, buses) and utilize software (e.g., middleware) for facilitating the transfer of data and control signals between devices.

The database 508, persistent storage 510 and memory 512 can be a computer-readable medium. The term "computer-readable medium" refers to any medium that participates in providing instructions to a processor 502 for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves.

In some implementations, the memory 512 further includes an operating system 516 (e.g., Mac OS® server, Windows® NT server), a network communication module 518 and a log management application 520. The operating system 516 can be multi-user, multiprocessing, multitasking, multithreading, real time, etc. The operating system 516 performs basic tasks, including but not limited to: recognizing input from and providing output to the administrator computer 504; keeping track and managing files and directories on computer-readable mediums (e.g., memory or a storage device); controlling peripheral devices (e.g., database 508, persistent storage 510); and managing traffic on the one or more communication channels 514. The network communications module 518 includes various components for establishing and maintaining network connections (e.g., software for implementing communication protocols, such as TCP/IP, HTTP, etc.) with various devices over a network, such as the collectors 102a through 102n. The log management application 520 includes a pre-parser 522, a parser/mapper 524, a tag indexer 526, a tag reporter 528 and a co-occurrence map 530. Each of these components is described in reference to FIGS. 1-4.

The architecture 500 is one example of a suitable architecture for hosting a log management application 520. Other architectures are possible, which include more or fewer components. For example, the database 508 and persistent storage 510 can be the same storage device or separate storage devices. The components of architecture 500 can be located in the same facility or distributed among several facilities. The architecture 500 can be implemented in a parallel processing or peer-to-peer infrastructure or on a single device with one or more processors. The log management application 520 can include multiple software components or it can be a single body of code. Some or all of the functionality of the log management application 520 can be provided as a service to end users over a network.

Various modifications may be made to the disclosed implementations and still be within the scope of the following claims.

What is claimed is:

1. A method executed by a computer, comprising:
receiving a report search query from one more event data collectors;
parsing the report search query to determine a specified attribute of an event being searched;
retrieving values or statistics associated with the specified attribute;
determining a co-occurring attribute of the specified attribute;
aggregating at least one of values or statistics associated with the co-occurring attribute; and
generating a report that includes at least one of the values or statistics associated with the co-occurring attribute, wherein generating the report comprises:
projecting event data in a log file into one or more attribute/value pairs, including generating the attribute/value pairs based on a message type of the event data, the message type being determined by a signature of the event data; and
determining the statistics on the co-occurring attribute using a combination of:
an attribute co-occurrence data structure identifying a relationship between the specified attribute and the co-occurring attribute; and
an index mapping each of the one or more attribute/value pairs to an inverted reference pointer referencing an instance of the event data, the instance of event data including a raw log message corresponding to the respective attribute/value pair.

2. The method of claim 1, wherein determining the co-occurring attribute includes searching the attribute co-occurrence data structure for the co-occurring attribute.

3. The method of claim 1, wherein the relationship between the specified attribute and the co-occurring attribute indicates that the report search query for finding a textual message including both the specified attribute and the co-occurring attribute is allowable.

4. The method of claim 3, wherein:
the one or more attribute/value pairs are generated from event data in a log file; and
generating the report comprises providing access to the event data in the log file using the reference pointer.

5. The method of claim 4, wherein
the instance of the event data includes a textual message based on which each of the one or more attribute/value pairs was generated.

6. A non-transitory computer-readable storage medium storing instructions, the instructions configured to cause a computer to perform operations comprising:
receiving a report search query from one more event data collectors;
parsing the report search query to determine a specified attribute of an event being searched;
retrieving values or statistics associated with the specified attribute;
determining a co-occurring attribute of the specified attribute;
aggregating at least one of values or statistics associated with the co-occurring attribute; and
generating a report that includes at least one of the values or statistics associated with the co-occurring attribute, wherein generating the report comprises:
projecting event data in a log file into one or more attribute/value pairs, including generating the attribute/value pairs based on a message type of the event data, the message type being determined by a signature of the event data; and
determining the statistics on the co-occurring attribute using a combination of:
an attribute co-occurrence data structure identifying a relationship between the specified attribute and the co-occurring attribute; and
an index mapping each of the one or more attribute/value pairs to an inverted reference pointer referencing an instance of the event data, the instance of event data including a raw log message corresponding to the respective attribute/value pair.

7. The non-transitory computer-readable storage medium of claim 6, wherein determining the co-occurring attribute includes searching the attribute co-occurrence data structure for the co-occurring attribute.

8. The non-transitory computer-readable storage medium of claim 6, wherein the relationship between the specified attribute and the co-occurring attribute indicates that the report search query for finding a textual message including both the specified attribute and the co-occurring attribute is allowable.

9. The non-transitory computer-readable storage medium of claim 8, wherein:
the one or more attribute/value pairs are generated from event data in a log file; and
generating the report comprises providing access to the event data in the log file using the reference pointer.

10. The non-transitory computer-readable storage medium of claim 9, wherein the instance of the event data includes a textual message based on which each of the one or more attribute/value pairs was generated.

11. A system comprising:
one or more computing devices configured to perform operations comprising:
receiving a report search query from one more event data collectors;
parsing the report search query to determine a specified attribute of an event being searched;
retrieving values or statistics associated with the specified attribute;
determining a co-occurring attribute of the specified attribute;
aggregating at least one of values or statistics associated with the co-occurring attribute; and
generating a report that includes at least one of the values or statistics associated with the co-occurring attribute, wherein generating the report comprises:
projecting event data in a log file into one or more attribute/value pairs, including generating the attribute/value pairs based on a message type of the event data, the message type being determined by a signature of the event data; and determining the statistics on the co-occurring attribute using a combination of:
- an attribute co-occurrence data structure identifying a relationship between the specified attribute and the co-occurring attribute; and
- an index mapping each of the one or more attribute/value pairs to an inverted reference pointer referencing an instance of the event data, the instance of event data including a raw log message corresponding to the respective attribute/value pair.

12. The system of claim 11, wherein determining the co-occurring attribute includes searching the attribute co-occurrence data structure for the co-occurring attribute.

13. The system of claim 11, wherein the relationship between the specified attribute and the co-occurring attribute indicates that the report search query for finding a textual message including both the specified attribute and the co-occurring attribute is allowable.

14. The system of claim 13, wherein:
- the one or more attribute/value pairs are generated from event data in a log file; and
- generating the report comprises providing access to the event data in the log file using the reference pointer.

15. The system of claim 14, wherein
the instance of the event data includes a textual message based on which each of the one or more attribute/value pairs was generated.

* * * * *